(12) United States Patent
Pahle et al.

(10) Patent No.: US 8,388,231 B2
(45) Date of Patent: Mar. 5, 2013

(54) ROLLER BEARING, PARTICULARLY FOR MOUNTING THE WHEEL OF A COMMERCIAL VEHICLE

(75) Inventors: Wolfgang Pahle, Bad Wiessee (DE); Johann Baumgartner, Moosburg (DE)

(73) Assignee: Knorr-Bremse Systems fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/761,132

(22) Filed: Apr. 15, 2010

(65) Prior Publication Data

US 2010/0254644 A1 Oct. 7, 2010

Related U.S. Application Data

(63) Continuation of application No. PCT/EP2008/008539, filed on Oct. 9, 2008.

(30) Foreign Application Priority Data

Oct. 18, 2007 (DE) .................. 10 2007 049 982

(51) Int. Cl.
*F16C 19/49* (2006.01)
*F16C 19/54* (2006.01)
*F16C 33/60* (2006.01)

(52) U.S. Cl. ........ 384/494; 384/504; 384/548; 384/565; 384/604; 29/898.061

(58) Field of Classification Search .......... 384/494–495, 384/504, 512, 544, 548, 565, 589, 604, 490; 29/898.061

See application file for complete search history.

(56) References Cited

U.S. PATENT DOCUMENTS

| 2,208,724 | A | | 12/1936 | Griswold | |
|---|---|---|---|---|---|
| 3,937,535 | A | * | 2/1976 | Ladin | 384/544 |
| 5,009,523 | A | * | 4/1991 | Folger et al. | 384/564 |
| 6,752,696 | B2 | * | 6/2004 | Murai et al. | 451/49 |
| 7,427,163 | B2 | * | 9/2008 | Schoder et al. | 384/494 |
| 7,547,147 | B2 | * | 6/2009 | Niebling et al. | 384/544 |
| 2001/0016520 | A1 | | 8/2001 | Sahashi et al. | |
| 2009/0010583 | A1 | | 1/2009 | Mock et al. | |
| 2009/0116778 | A1 | | 5/2009 | Mock et al. | |
| 2009/0238509 | A1 | | 9/2009 | Abraham et al. | |
| 2010/0247019 | A1 | * | 9/2010 | Doppling et al. | 384/589 |
| 2011/0033149 | A1 | * | 2/2011 | Bohr et al. | |

FOREIGN PATENT DOCUMENTS

| DE | 465 534 A | | 9/1928 |
|---|---|---|---|
| DE | 3004672 A | * | 8/1981 |
| DE | 85 01 369 U1 | | 4/1985 |
| DE | 92 02 230 U1 | | 6/1992 |
| DE | 92 14 796 U1 | | 2/1993 |
| DE | 43 34 195 A1 | | 3/1994 |
| DE | 10 2004 038 709 A1 | | 2/2006 |

(Continued)

OTHER PUBLICATIONS

International Search Report dated Jul. 21, 2009 with English translation (six (6) pages).

(Continued)

*Primary Examiner* — Marcus Charles
(74) *Attorney, Agent, or Firm* — Crowell & Moring LLP

(57) ABSTRACT

A roller bearing, particularly for mounting the wheel of a commercial vehicle, has two angular-contact ball bearings placed in an O-arrangement relative to one another. The roller bearing is designed such that each angular-contact ball bearing is associated to a roller body row having a common inner ring with the angular contact ball bearing, wherein the two roller body rows are facing one another and form inner bearing rows.

11 Claims, 4 Drawing Sheets

FOREIGN PATENT DOCUMENTS

| | | |
|---|---|---|
| DE | 10 2006 004 273 A1 | 8/2007 |
| DE | 10 2006 004 274 A1 | 8/2007 |
| DE | 10 2006 025 551 A1 | 12/2007 |
| DE | 102006031956 A1 * | 1/2008 |
| DE | 102007034813 A1 * | 1/2009 |
| EP | 0 627 049 B1 | 12/1994 |
| WO | WO 85/03749 A1 | 8/1985 |
| WO | WO 2005/008086 A1 | 1/2005 |
| WO | WO 2007/137929 A1 | 12/2007 |
| WO | WO 2009/030574 A1 | 3/2009 |

OTHER PUBLICATIONS

German Office Action dated Oct. 1, 2008 with English translation (ten (10) pages).

* cited by examiner

ROLLER BEARING, PARTICULARLY FOR MOUNTING THE WHEEL OF A COMMERCIAL VEHICLE

CROSS REFERENCE TO RELATED APPLICATIONS

This application is a continuation of PCT International Application No. PCT/EP2008/008539, filed Oct. 9, 2008, which claims priority under 35 U.S.C. §119 from German Patent Application No. DE 10 2007 049 982.7, filed Oct. 18, 2007, the entire disclosures of which are herein expressly incorporated by reference.

BACKGROUND AND SUMMARY OF THE INVENTION

The invention relates to a roller bearing, in particular for mounting a commercial vehicle wheel.

To mount the wheels of heavy commercial vehicles, use is made, for example, of tapered-roller bearings which, while having a relatively small installation space, have a high load capacity and are thereby particularly suitable for the intended application.

Here, wheel bearing designs are known in which the tapered-roller bearings are designed as individual bearings, which however require a relatively large installation space. To reduce the spatial requirement, tapered-roller bearings have recently been combined to form so-called "compact wheel bearing units" in which the inner rings of the tapered-roller bearings bear against one another at an end side. In passenger vehicle wheel bearings, use is made of compact wheel bearing units of the type in which two angular-contact ball bearings are provided in an O-shaped arrangement, but these angular-contact ball bearings have a lower load capacity than tapered-roller bearings and are therefore less suitable for use in heavy commercial vehicles.

Also worth mentioning in this connection are so-called tandem angular-contact ball bearings in which, in contrast to the O-shaped arrangement, the axial support of force takes place in the same direction, with the balls of one of the two ball rows having a larger diameter and often being arranged at a larger running circle diameter than the balls of the other ball row.

The higher load capacity of the tapered-roller bearings comes at the cost of higher friction losses in relation to angular-contact ball bearings, which leads to correspondingly higher fuel consumption. This may amount to as much as 1% for example in a commercial vehicle with ten wheels.

Furthermore, the unfavorable friction values lead to relatively intense heating of the roller bearing, as a result of which, with the simultaneous introduction of heat from friction heat generated during braking, the service life of the roller bearing is reduced.

In this respect, the known roller bearings constitute only unsatisfactory solutions.

The object on which the invention is based is that of further developing a roller bearing of the above-mentioned type such that its load capacity and service life are optimized while requiring only the smallest possible installation space.

This and other objects are achieved by a roller bearing in particular for mounting a commercial vehicle wheel, having two angular-contact ball bearings in an O-shaped arrangement with respect to one another. Each angular-contact ball bearing is assigned a rolling body row which has a common inner ring with the angular-contact ball bearing, with the two rolling body rows being situated so as to face toward one another and forming the inner bearing rows.

A roller bearing according to the invention combines the high load capacity of a tapered-roller bearing with the service life of a ball bearing, while at the same time having a minimized structural height. This results in significant advantages for use in heavy commercial vehicles, in particular with regard to economical use.

As a result of the lower friction values of the angular-contact ball bearings in relation to a tapered-roller bearing, the need for repairs, such as would otherwise arise as a result of overheating, is greatly reduced, which naturally results in a reduction in operating costs. Furthermore, the installation space which need be made available in a wheel hub can be kept relatively small, with a consequential weight saving, such as is constantly sought in automotive engineering.

According to one advantageous refinement of the invention, the rolling bodies which form the inner bearing rows are smaller in terms of their rolling radius than the balls of the associated angular-contact ball bearings, wherein the rolling bodies of the inner bearing rows may likewise be formed as balls, or else as barrel-shaped or cylindrical rollers.

If balls are used as rolling bodies for the inner bearing rows, the inner bearing rows are formed in the manner of angular-contact ball bearings which are preferably provided in a tandem arrangement with the associated outer angular-contact ball bearing. In this respect, the new roller bearing forms, so to speak, a double tandem angular-contact ball bearing overall.

According to the invention, each outer angular-contact ball bearing and the associated inner bearing row has a common inner ring, such that the rolling bearing is provided, overall, with two inner rings.

In principle, the roller bearing may have a common outer ring for all four bearing rows. It is however also contemplated for each individual rolling body pair composed of an inner and an outer bearing row to be provided with one outer ring depending on installation space and assembly requirements.

As mentioned, the rolling radii of the inner rolling bodies are preferably smaller than the rolling radii of the outer rolling bodies. In addition to this, however, the running circle diameter of the inner bearing rows may be smaller than that of the outer angular-contact ball bearings. It is however also contemplated for the inner and outer bearing rows to be arranged on an equal running circle diameter.

In accordance with the different usage conditions, the two bearing rows of each bearing pair may be positioned at different support angles. To obtain a maximum supporting width, in each case the outer balls of the angular-contact ball bearings are arranged at a large support angle, and the two inner bearing rows are arranged with smaller support angles in order to obtain a maximum radial load capacity. To optimize the radial load capacity, the inner bearing rows may also be formed as purely radial bearings. In this case, to minimize an axial spatial requirement, use should be made of rolling bodies in the form of the stated barrel-shaped or cylindrical rollers.

If cylindrical rollers are used, tolerances arising from an axial bracing of the overall roller bearing must be directly compensated, since then, to a defined extent, only the outer ball rows of the angular-contact ball bearings, which are inclined in relation to one another, absorb the axial load, or determine the axial play during adjustment with regard to the least possible play.

An accurately fitting arrangement may be obtained by way of the inner rings bearing against one another at the end side or by way of correspondingly dimensioned spacer sleeves.

Here, the connection of the two inner rings takes place by means of an inner ring joint seal such as is known per se.

Further advantageous embodiments are described herein.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
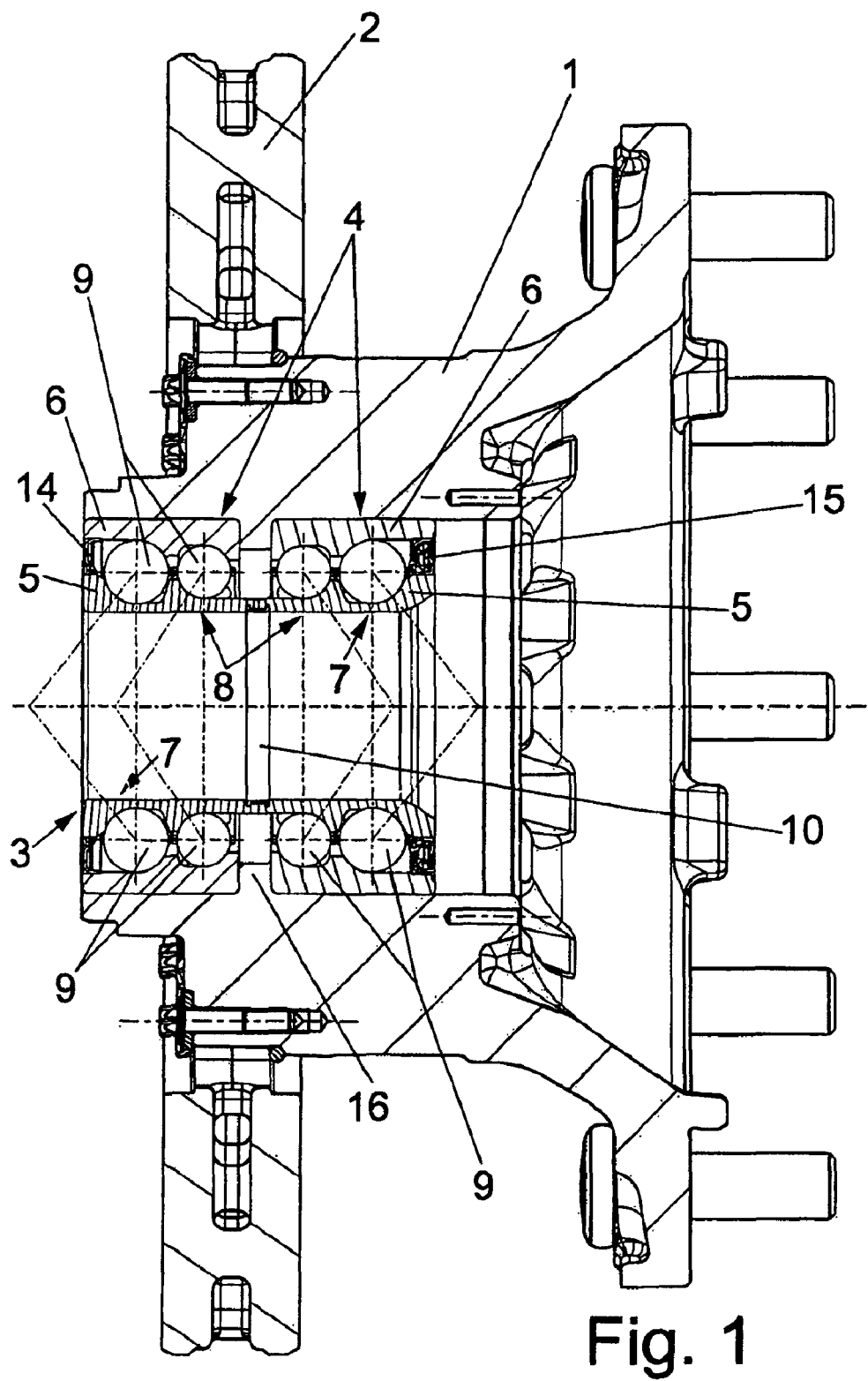
FIG. 1 shows an exemplary assembled roller bearing according to the invention in a longitudinal section view.

FIG. 1 illustrates a roller bearing 3 installed in a wheel hub 1 of a commercial vehicle, with a brake disk 2 being fastened to the wheel hub 1. The roller bearing 3 is composed of two bearing pairs 4 which, together, form a compact roller bearing. Here, the new roller bearing has basically two inner rings 5, specifically one for each bearing pair 4. The inner rings 5 are connected to one another by a joint seal 10, by which the bearing play can also be set.

Furthermore, in the example of FIG. 1, each bearing pair 4 has a separate outer ring 6. The roller bearing 3 is provided with two angular-contact ball bearings 7 in an O-shaped arrangement with respect to one another, which angular-contact ball bearings 7 in each case form an outer bearing ring. Each angular-contact ball bearing 7 is assigned a rolling body row, which rolling body rows are situated facing toward one another and form inner bearing rows 8.

In the example of FIG. 1, the inner bearing rows 8 are likewise designed as angular-contact ball bearings and are arranged with regard to their support so as to form, together with the outer bearing row, that is to say the angular-contact ball bearing 7, in each case one so-called tandem arrangement. Here, the rolling bodies of the inner bearing rows 8 are designed as balls 9 whose diameter is smaller than the diameter of the balls 9 of the angular-contact ball bearing 7.

The split outer rings 6 are supported, with their end sides which face toward one another, on an annular shoulder 16 of the hub 1, while the opposite sides of the roller bearing 3 are closed off by a sealing ring 14 or a shaft sealing ring 15.

Figure 2:
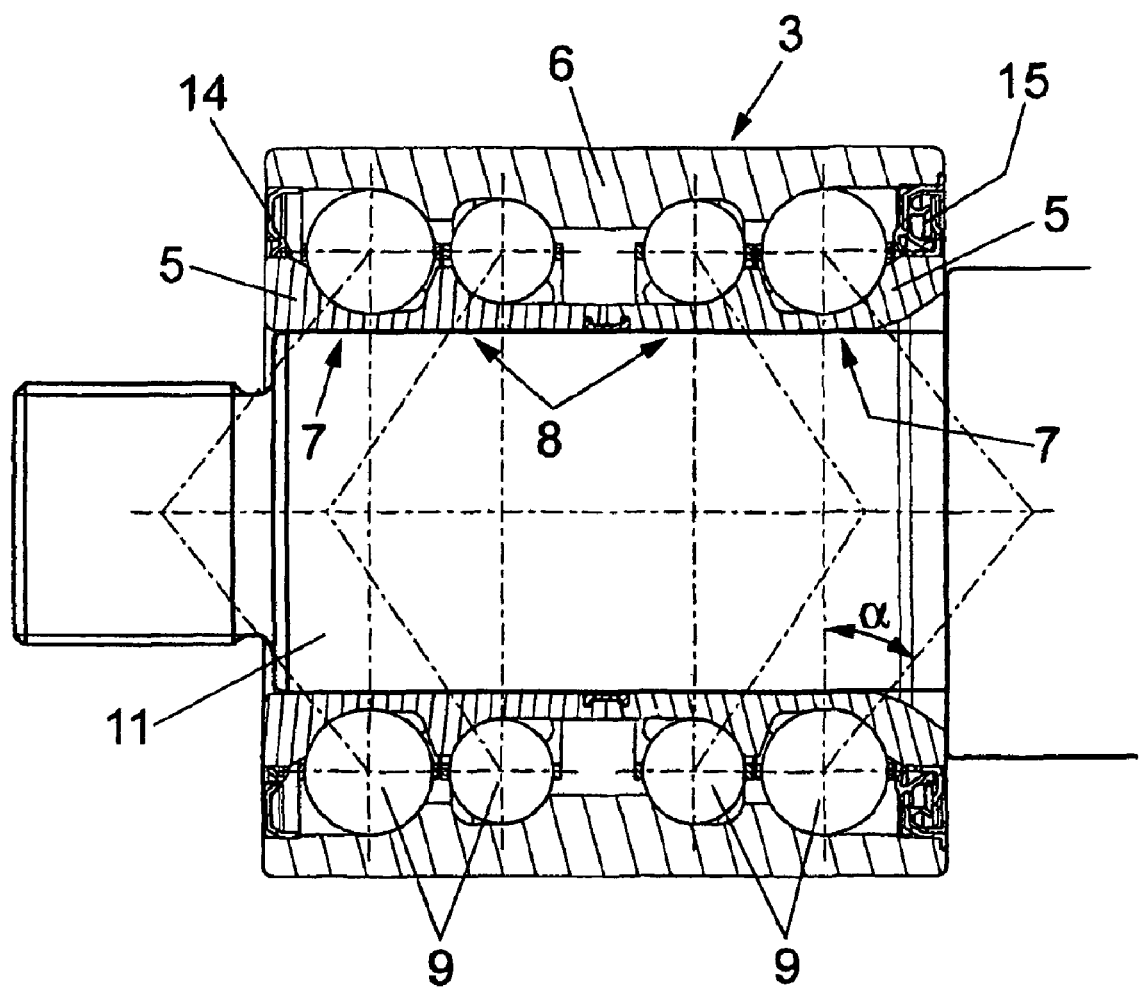
FIGS. 2 to 4 show, in each case, one further exemplary embodiment of a roller bearing according to the invention, likewise in a longitudinal section view.

In the example of a roller bearing 3 shown in FIG. 2, which roller bearing 3 corresponds in terms of its basic design to that of FIG. 1, a single-piece outer ring 6 is provided, while the arrangement and configuration of the bearing pairs or bearing rings corresponds to that in FIG. 1. In the illustration, the roller bearing 3 is mounted on a shaft 11. The support angle with which the balls 9 bear against the inner raceway of the inner ring 5 for the absorption of axial forces is denoted here by α.

Figure 3:
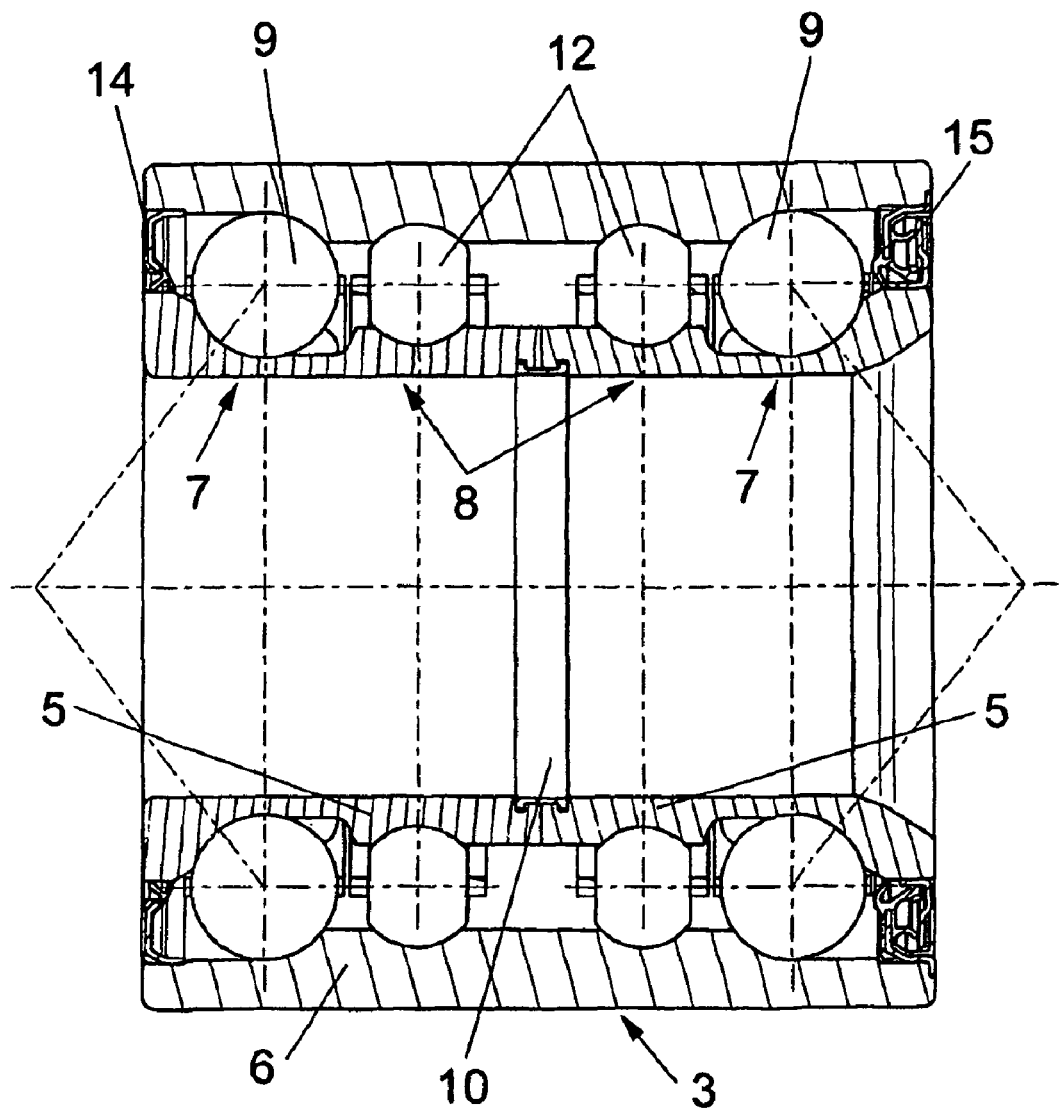

FIG. 3 shows an example in which the roller bearings of the inner bearing rows 8 are composed of barrel-shaped rollers 12, which are arranged in the manner of deep-groove ball bearings and serve only to absorb radial forces. The barrel-shaped rollers 12, which may also be composed of balls which are flattened on both sides, are kept very small in terms of their structural height, so as to give a small overall spatial requirement for the installation of the roller bearing 3.

Figure 4:
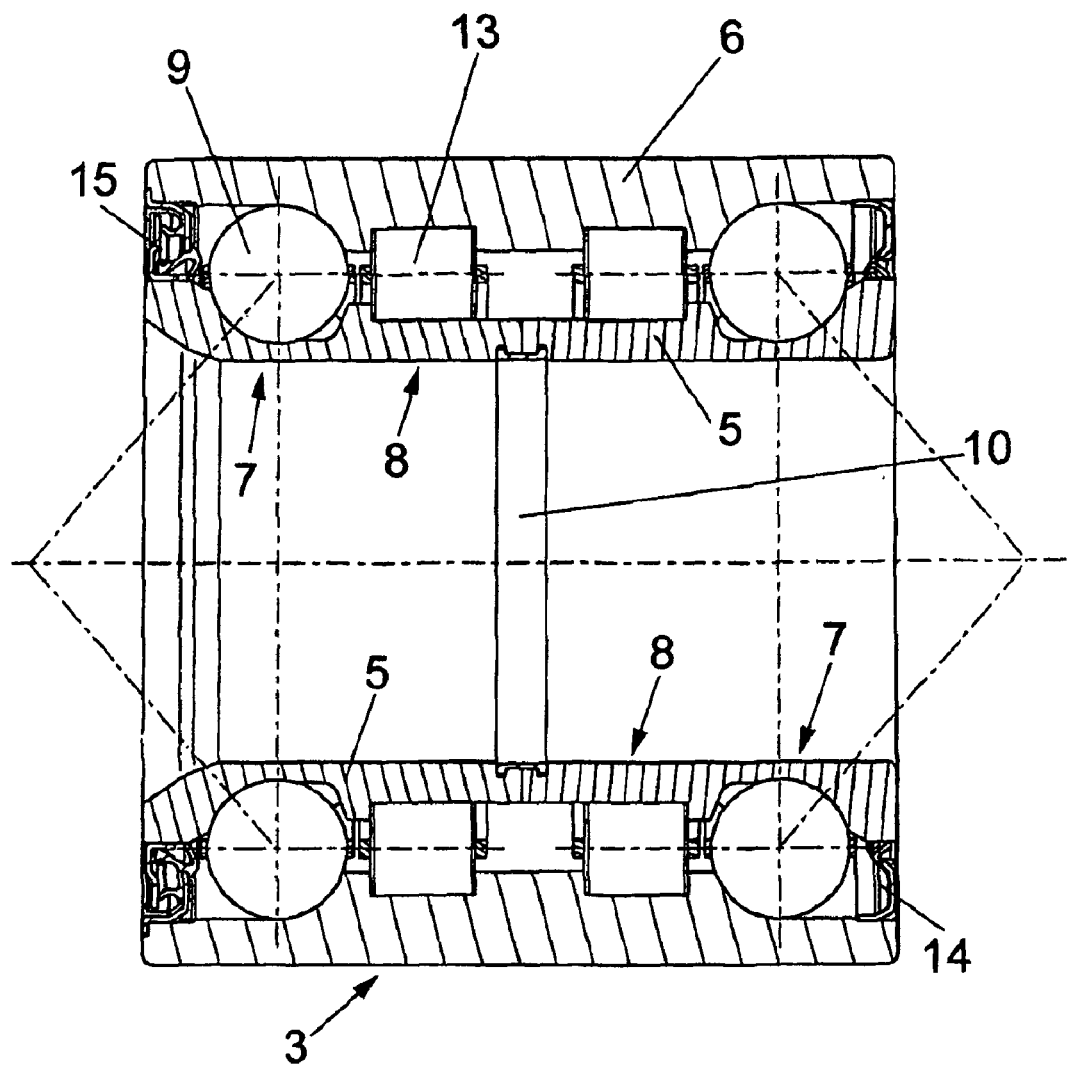

Also advantageous in this context is the roller bearing according to FIG. 4 in which the inner bearing rows 8 each have rolling bodies designed as cylindrical rollers 13, which likewise absorb radial forces. The outer ring 6 is of single-piece design both in the example of FIG. 3 and also in that according to FIG. 4.

Furthermore, the new roller bearing is characterized by extremely simple assembly. For this purpose, firstly the outer bearing rows, that is to say the balls 9 of the angular-contact ball bearing are pre-mounted onto the respective inner ring 5 and the inner bearing rows 8 into the outer ring 6. The inner rings are subsequently pushed into the one or more outer rings 6 and the joint seal 10 is mounted.

Only by way of this separate pre-mounting is it possible for the contact shoulders of the angular-contact ball bearings 7 to be placed against the balls 9 with such large coverage as to provide a desired large active support surface.

TABLE OF REFERENCE SYMBOLS

1 Wheel hub
2 Brake disk
3 Roller bearing
4 Bearing pair
5 Inner ring
6 Outer ring
7 Angular-contact ball bearing
8 Inner bearing row
9 Ball
10 Joint seal
11 Shaft
12 Roller
13 Roller
14 Sealing ring
15 Shaft sealing ring
16 Annular shoulder The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A roller bearing for mounting a vehicle wheel, comprising:
   two angular-contact ball bearings, each configured in an arrangement of parallel ball rows spaced apart with respect to one another,
   wherein each of said two angular-contact ball bearings is assigned a rolling body row having a common inner ring with one of the two angular-contact ball bearings, the two rolling body rows being arranged to face toward one another and form inner bearing rows when each common inner ring of each of the two angular-contact ball bearings is facing one another,
   wherein rolling bodies of the inner bearing rows are configured as barrel-shaped rollers, and
   wherein the barrel-shaped rollers comprise balls that are flattened on opposing sides and are arranged with the flattened opposing sides perpendicular to a rotation axis of the roller bearing.

2. The roller bearing according to claim 1, further comprising a common outer ring for the two bearing pairs that are formed.

3. The roller bearing according to claim 1, further comprising a separate outer ring for each of the two bearing pairs that are formed.

4. The roller bearing according to claim 1, wherein each bearing pair is configured as a tandem ball bearing.

5. The roller bearing according to claim 1, wherein rolling bodies of the inner bearing rows are smaller than balls of the angular-contact ball bearings forming outer bearing rows.

6. The roller bearing according to claim 1, wherein a running circle diameter of the inner bearing rows is equal to or smaller than the running circle diameter of the outer bearing rows.

7. The roller bearing according to claim 1, wherein the rolling bodies of the inner bearing rows are configured as cylindrical rollers.

8. The roller bearing according to claim 7, wherein the cylindrical rollers are guided in a radial bearing manner.

9. The roller bearing according to claim 1, wherein the barrel-shaped rollers are guided in a radial bearing.

10. The roller bearing according to claim 1, wherein a support angle of balls of the two angular-contact ball bearings forming the outer bearing rows in relation to a radial axis aligned perpendicular to a longitudinal axis of the roller bearing is greater than a support angle of balls arranged in an angular-contact ball bearing manner forming the inner bearing rows.

11. The roller bearing according to claim 1, wherein the roller bearing is a commercial vehicle roller bearing.

* * * * *